Oct. 20, 1959 G. B. SHIELDS 2,909,617

RECORDER-REPRODUCER

Filed June 30, 1954 3 Sheets-Sheet 1

Inventor
George B. Shields
By Mason, Kolehmainen, Rathburn & Wyss
attorneys

Oct. 20, 1959 G. B. SHIELDS 2,909,617

RECORDER-REPRODUCER

Filed June 30, 1954 3 Sheets-Sheet 2

Inventor
George B. Shields
By
Mason, Kolehmainen, Rathburn & Wyss
Attorneys

Oct. 20, 1959 G. B. SHIELDS 2,909,617

RECORDER-REPRODUCER

Filed June 30, 1954 3 Sheets-Sheet 3

INVENTOR.
George B. Shields
BY
Mason, Kolehmainen, Rathburn & Wyss
Attys.

United States Patent Office 2,909,617

Patented Oct. 20, 1959

2,909,617

RECORDER-REPRODUCER

George B. Shields, Racine, Wis., assignor to Webster Electric Company, Racine, Wis., a corporation of Delaware Application June 30, 1954, Serial No. 440,515

16 Claims. (Cl. 179—100.2)

Figure 1:
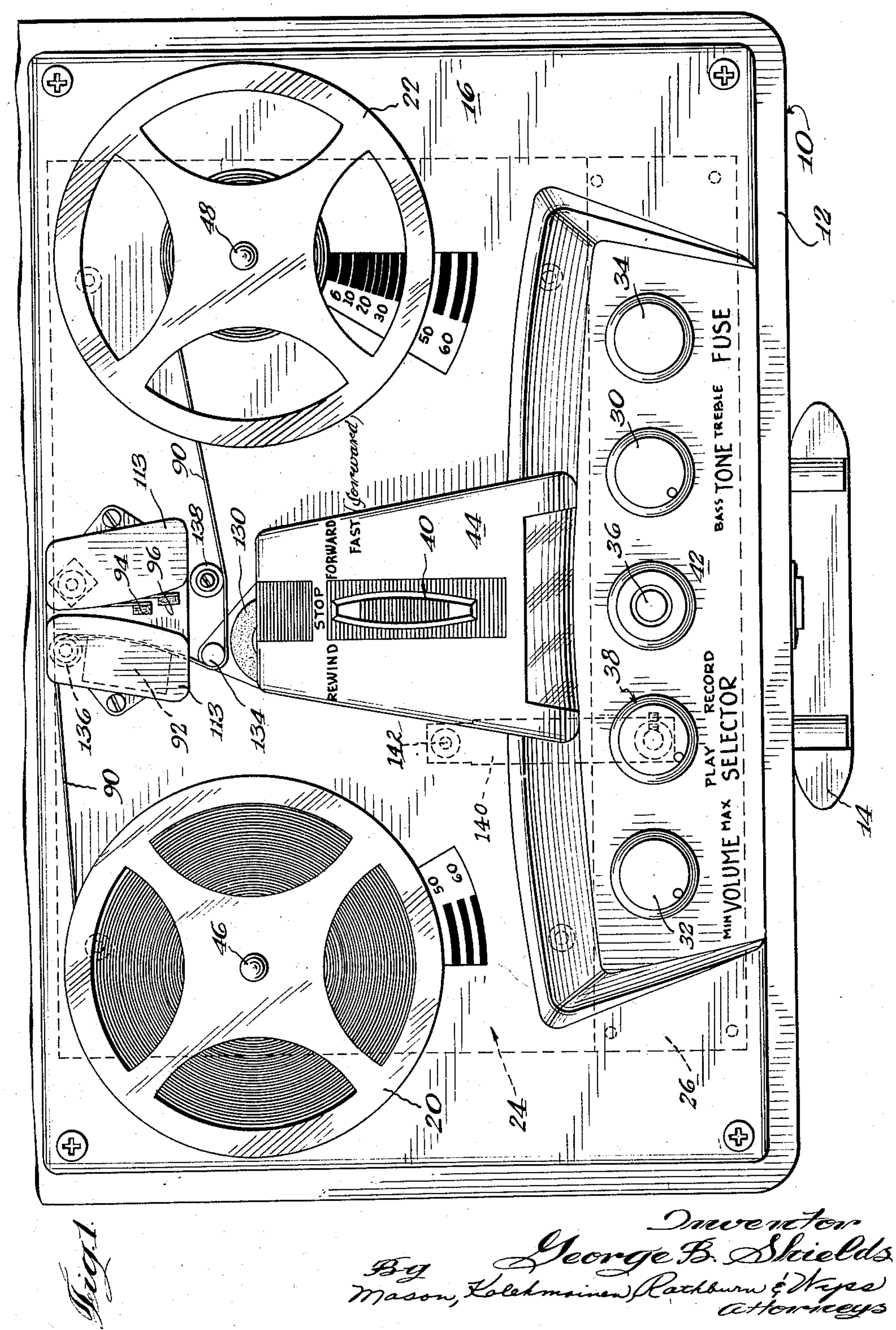

The present invention relates to a recorder-reproducer and, more particularly, to such an apparatus having a new and improved interlock mechanism for preventing inadvertent erasing of previously recorded information and for permitting the recorder-reproducer to be utilized as a low power public address system. This application is a continuation-in-part of my prior copending application, Serial No. 203,290, filed December 29, 1950 entitled Recorder-Reproducer, now abandoned, and also claims the interlock mechanism shown in my copending application, Serial No. 438,655, filed June 23, 1954, which application is assigned to the same assignee as the present invention.

Tape recorders represent a relatively large investment and should be capable of as extensive use as possible. At present, the sound channels in tape recorders including amplifier and electroacoustical transducer components are only available for recording signals on or for reproducing signals from the magnetic medium, although the necessary components for a low power public address system are present. These components now cannot be used as a public address system since the present tape recorders having interlock mechanisms are arranged to prevent listen-record controls from being operated to condition the transducing means for recording operations wherein external signal sources such as a microphone or a tap to a radio-audio output are connected to the amplifier input except when the magnetic medium is being moved at a proper speed for either a recording or a reproducing operation.

Further, recorders and reproducers of the magnetic type have remained relatively heavy, cumbersome and complicated devices despite the effort that has been given to their simplification. Among the parts of these recorder-reproducers which may be so designated are the interlock means provided for the purpose of preventing or at least minimizing the possibility of inadvertent erasure of previously recorded information from a magnetic tape or wire.

Accordingly, the present invention has for an object the provision of new and improved interlock means for use in an arrangement wherein separate controls are provided, e.g. one for conditioning the apparatus for stop, forward, fastforward or rewind operation and a second for conditioning the electrical components of the apparatus for either recording or reproducing operations.

Another object of this invention is to provide improved interlock means which permit a listen-record control to be moved to a record position in any of the settings of a main control which conditions the magnetic medium for various modes of operation and movement.

A still further object involves the provision of an improved interlock mechanism which permits a listen-record control to be turned to a record position in all of the positions of the main control but which retains the record-listen control in a record position in only a selected group of the positions or settings of the main control.

Another object is to provide means correlated with the main and listen-record controls whereby the recorder-reproducer apparatus may be utilized as a public address system.

A still further object is to provide recorder-reproducer apparatus having interlock means which permits a listen-record control to be moved to and held in a record position in which the amplifier and electroacoustical components of the apparatus are effective to amplify and reproduce signals from an external source in a stop position of the main control wherein movement of the magnetic medium is arrested.

Another object of the present invention is to provide a new and improved interlock means of the type mentioned wherein a playback-record or listen-record selector will remain in the record position when the associated control conditions the apparatus for recording, e.g. a forward operation in which the recording is effected.

A still further object is to provide an interlock mechanism for recorder-reproducer apparatus which automatically returns a listen-record control to a particular position, e.g. a listen position, in response to movement of the main control to any of its plurality of different settings.

Another object is to provide sound reproducing components which are correlated with an interlock mechanism to permit these components to be utilized as a low power public address system when movement of a magnetic medium is arrested.

In accordance with these and many other objects, one embodiment of the invention includes a first lever movable with a main control having a stop, forward, fastforward and rewind setting and a second lever movable with a listen-record or play-record selector. These two levers together with their associated controls are each independently movable and are further so correlated that the play-record lever can be engaged to hold its associated selector in a record position only in a particular position (forward) of the main control. The selector is retained in this position by the main control lever until such time as it is manually moved out of it or until such time as the main control is moved out of its forward setting.

In a second embodiment of the invention, the tape recorder apparatus includes a first lever or arm movable with a listen-record selector and a cam forming a portion of a main control movable to stop, forward, fastforward and rewind settings. This cam is provided with a plurality of control surfaces which are engaged by a cam follower thereby selectively to move a free end of the cam follower adjacent the listen-record arm so that this arm is engaged and its associated selector retained in a record position when the main control is adjusted to its stop or forward positions, thereby rendering electrical and electroacoustical components of the transducer effective to amplify signals received from an external source either when the magnetic medium is moved or when the movement thereof is arrested. The cam forming a portion of the main control is also provided with release surfaces which automatically move the cam follower out of engagement with the listen-record arm in response to movement of the main control to any of its operative settings thereby automatically to return the listen-record selector to a listen position.

Figure 2:
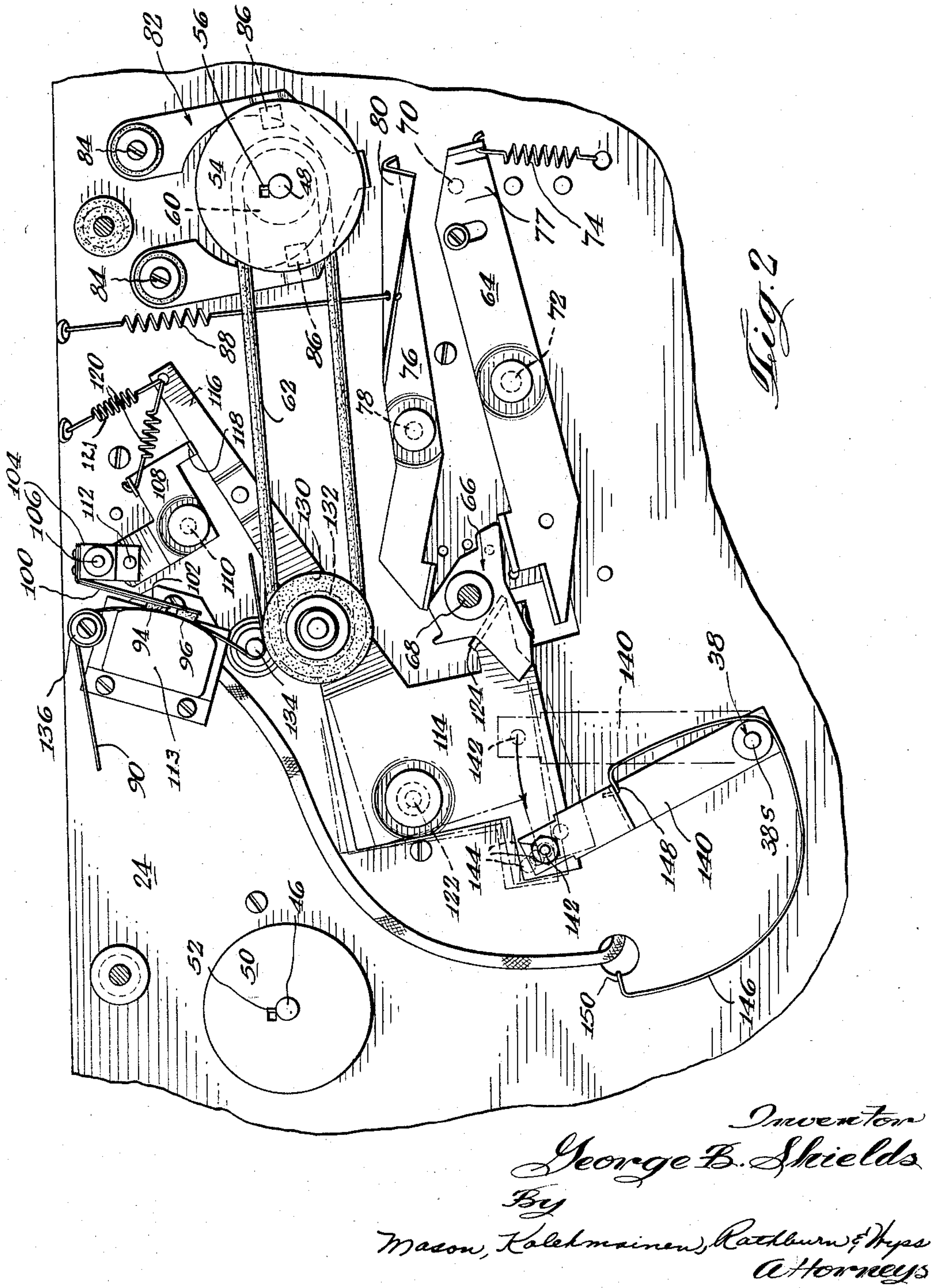
Figure 3:
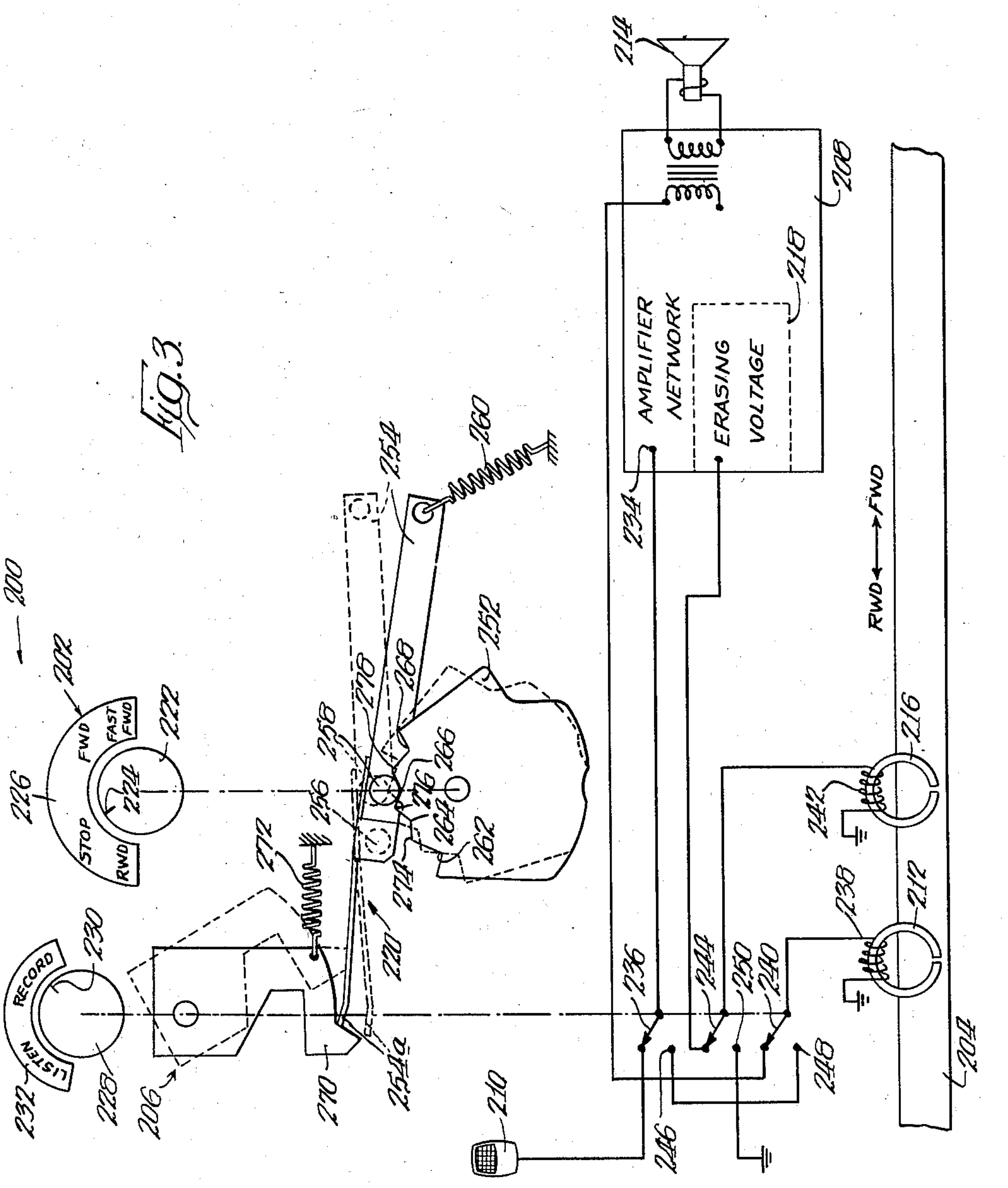

Other objects and advantages of the present invention will become apparent from the ensuing description of the illustrative embodiments thereof in the course of which reference is had to the accompanying drawings wherein:

Fig. 1 is a fragmentary top elevational view of a recorder-reproducer constructed in accordance with one embodiment of the present invention. In the view, the apparatus is illustrated in its stop position and only a portion of the cabinet is shown, the cover having been omitted entirely;

Fig. 2 is a fragmentary plan sectional view illustrating details of the mechanism shown in Fig. 1 when conditioned for recording operations, certain other of the mechanism being illustrated in dashed lines in positions occupied thereby when the apparatus is conditioned for fast-forward, rewind and stop; and Fig. 3 is a diagrammatic view of a second embodiment of an interlock mechanism for a recorder-reproducer apparatus shown in conjunction with a schematic diagram of the electrical components of the recorder-reproducer apparatus illustrating the manner in which the interlock mechanisms forming the first and second embodiments of the invention may be utilized to permit the apparatus to be operated as a public address system.

The apparatus of the first embodiment of the present invention shown in Figs. 1 and 2 of the drawings has not been illustrated in detail because of the fact that the present invention pertains only to the interlock mechanism and its correlation with the electrical and electro-acoustical components thereof. The entire mechanism is, however, disclosed, and certain features thereof claimed in the copending application of David J. Munroe, Serial No. 408,235, filed February 4, 1954, as a continuation of a prior application of David J. Munroe, Serial No. 176,576 filed July 29, 1950, now abandoned, which is assigned to the assignee of the present invention. However, sufficient of the mechanism has been included to provide an understanding of the construction and the advantages to those skilled in the art.

The control of the recorder-reproducer is such that it can be conditioned for the performance of (1) recording, (2) reproducing or listening, (3) rewinding, (4) fast-forward operation, (5) stop condition, and (6) operation as a public address system. The control includes a main or central control knob mounted on a readily accessible position of the apparatus which is movable from a normal stop setting to a rewind setting and also to forward or fast-forward settings, thereby to provide a control over the type or mode of operation of the apparatus as respects to movement of the magnetic medium. The control includes also a selector knob movable from a normal play or reproduce position to which it is biased to a record position in which position it will remain only if the main control knob is in its forward position which it occupies during recording operation. However, the independently operable selector knob may be moved to a record position when the main control knob is not in its forward position thereby to condition the recorder-reproducer for use as a public address system, although the play-record control will not be retained in the record position following the release of the knob.

Referring now to Fig. 1, a magnetic recorder-reproducer which is indicated generally by reference character 10 includes a suitable portable cabinet 12 adapted to be closed by a cover (not shown) which may be hinged or detachably connected to the cabinet. The cabinet is of relatively small size and is adapted to be carried by a suitable handle such as 14 which is secured to the front wall of the cabinet. Fig. 1 as heretofore noted is a top plan view of the device with the cover removed. When the cover is removed, the top plate 16 is open to view as are a tape supply spool or reel 20, a takeup spool 22 and various controls, etc. to which reference will be had shortly.

Most of the component parts of the apparatus are located inside the cabinet and underneath the top plate. Among the parts so located are the power supply (not shown) and equipment forming a sound channel which, although not shown, may be of the type indicated schematically in Fig. 3 of the drawings. Also located inside of the cabinet and supported below the top plate are a mounting plate 24 upon which the operating and control mechanisms are mounted along with a sound equipment chassis 26.

As is apparent from Fig. 1, the various controls are readily accessible. Among these are a tone control 30 with which is associated a power switch; a volume control 32; and a movable fuse housing 34; a recording volume indicator light 36; a play-record selector 38; and a main control knob 40 forming a portion of a main control means. It is the interlocking of the last two mentioned elements with which the present invention is concerned as will be brought out in detail shortly. All but the main control knob are mounted in a narrow recess 42 located at the front of the top plate while the main control knob is placed above a central trapezoidal upstanding portion 44 of the top plate.

The supply spool is removably mounted upon a supply spool shaft 46 and the takeup spool is similarly mounted upon a takeup spool shaft 48, the shafts being selectively rotated in opposite directions to drive the tape in forward, fast-forward or rewind operations. The shaft 46 has frictionally secured to it a spool supporting plate 50 having an upstanding spool engaging pin 52. The shaft is rotatably journalled in a bearing mounted in the mounting plate and is driven by a pulley and belt drive (not shown) that is adapted selectively to be driven to rewind the tape.

The takeup spool shaft 48 has secured to it a spool supporting plate 54 having an upstanding spool engaging projection 56. The shaft is rotatably journalled in the mounting plate in such manner that it has some axial (vertical) movement whereby the shaft and thus the takeup spool may be selectively (1) freed for high speed rotation as in rewind or fast-forward operation or (2) gravity clutched as in standard forward drive during recording and reproducing or (3) positively braked when the apparatus is in its stop condition. The gravity clutching is accomplished through a drive disc located immediately below the supporting plate 54 but mounted for free rotation upon the shaft 48. The construction is such that when the shaft 48 and the plate 54 are free to move downwardly, the weight thereof effectively clutches the supporting plate to the drive disc between which may be located a felt washer or the like.

The takeup spool drive disc is driven at standard forward speed by a pulley 60 preferably integral with the disc and driven by a forward drive belt 62 in a manner to be described. The takeup spool and its drive disc are also adapted to be driven by a selectively effective fast-forward drive comprising a drive element such as a disc (not shown) secured to the lower end of the shaft 48 which extends below the mounting plate.

The clutching of the takeup spool is controlled by a clutch control lever 64 controlled in turn by a main cam 66 operatively connected to the main control knob 40 by a shaft 68. In the indicated position, the takeup spool is gravity clutched so as to be driven by the forward drive 60, 62. The operative connection between the lever 64 and the clutch is effected through means including a ball 70 engageable by the lever in its indicated position. The lever is pivotally movable about a pin 72 and is biased for movement in a clockwise direction by a spring 74. In the fast-forward and rewind positions, the clutch is disengaged by movement of the clutch control lever 64 and thus enabling the ball to move upwardly into a recess beneath a portion 77 of the lever.

The takeup spool is braked only in the stop position. The braking is controlled by a brake control lever 76 pivotally movable intermediate its ends about a pivot pin 78 having one end cooperating with the cam 66 and its opposite flanged end 80 cooperating with a brake yoke 82. The latter is generally U-shaped having its legs secured by a screw 84 to the mounting plate and carrying at its upper side brake pads 86 engageable with the underside of the drive disc. The lever is biased in a counterclockwise direction by a spring 88. In the indicated standard forward drive, the brake is ineffective.

A recording medium, in this case, magnetic tape indicated by reference character 90 is initially wound on the supply spool 20 and is adapted to be wound upon the takeup spool 22 at either the standard forward or fast-forward speed and to be rewound from the takeup spool to the supply spool at a fast rewind speed. The present invention is concerned primarily with the standard forward speed in which a record can be made upon the tape or the record previously made can be reproduced or played back, dependent upon the position of the selector 38, and with the stop position in which, although the magnetic tape 90 is not advanced, the electrical components of the apparatus 10 can be rendered effective by manually holding the selector 38 in a record position thereby to provide a public address system.

In its movement from the supply spool to the takeup spool at the standard forward speed when the apparatus is conditioned for recording as indicated in Fig. 2, the tape is held against the transducer 92 by a pair of pressure pads 94, 96 which serve to hold the tape against record-reproduce and erase portions of the transducer of which the latter is effective only in the record position of the selector. The pressure pads are mounted at the free ends of a pair of leaf springs 100, 102 mounted upon a movable bracket 104 pivotally movable about a pin 106. The bracket is moved by a lever 108 pivotally movable about a pin 110 and pivotally connected to the bracket by a pin 112. The transducer and pad supporting and operating structures are covered by removable covers 113.

As indicated, the pressure pads engage the tape to hold the tape firmly against the transducer, only in the forward position of the main control. In this position, the control lever 108 is moved to the position indicated in Fig. 2 by a main cam controlled main control lever 114 having an arm 116 engageable with a flange 118 formed at one end of the lever 108. These two levers are interconnected by a spring 120, and the lever 116 is biased in a counterclockwise direction by a spring 121.

The main control lever is pivotally movable about an axis defined by a pin 122 and includes a flanged portion 124 cooperatively associated with the main cam 66.

The main control lever also carries a freely rotatable rubber tired pinch roller 130 with which is associated a pulley 132 for driving the belt 62 through which the takeup spool is driven in the forward speed. The pinch roller serves to hold the tape against a capstan 134 selectively driven at constant speed and so driven in the standard forward position. The tape is guided by a pair of guide rollers 136 and 138.

The selector knob 38 of the play-record control is secured to a shaft 38*s* which operates a suitable control mechanism such as the switching apparatus shown in Fig. 3 of the drawings so as to selectively vary the connections between the transducing means 92, the amplifier means and external sources of signals such as a microphone or a tap to the audio output of a radio or other audio amplifying system. More specifically, in the play position, the record-reproduce portion of the transducing means 92 is connected to the input of an amplifying channel, the output of which is connected to an electro-acoustical transducer such as a loud speaker, and in this position the erasing portion of the transducing means 92 is rendered ineffective. In the record position, the input of the amplifier means is connected to an external source of signals such as a microphone and the output of the amplifier channel is directly connected to the record-reproduce portion of the transducing means 92. In this record position, the erasing portion of the transducing means 92 is rendered effective to remove previously recorded information from the magnetic tape 90.

In accordance with the present invention, the accidental erasure of recorded information from the magnetic tape 90 is prevented by interlock means which are so constructed and arranged that the selector controlled by the knob 38 may be turned to and will be retained in the record position only when the main control is in the forward position in which the magnetic tape 90 is being moved at a proper speed for transducing operations. The interlock means is shown as including a generally rearwardly extending arm 140 secured to the shaft 38 and having a detent ball 142 at its outer free end. This ball cooperates with an opening 144 in the front left hand corner of the lever 114, this opening being so located that the ball 142 only enters it in the forward position of the main control lever as indicated by the solid line drawing of Fig. 2. In this position, the arm 140 is held by the ball and the main control lever 114 to maintain the selector knob in its record position against the return force exerted thereon by a spring 146 having an end 148 secured to the arm and an end 150 secured to the mounting plate 24. In the record position, the knob 38 renders the erasing portion of the transducing means 92 effective.

To record information on the tape 90, the apparatus is supplied with power, the control knob 40 is operated to its forward position and the selector knob 38 is operated to its record position in which it is held by the above described interlock arrangement including the levers 140 and 114. When this is done, the apparatus is operated to the position indicated in Fig. 2 and the electrical circuits associated with the apparatus are conditioned for recording by the interconnection of an external source of signals such as a microphone with the input to the amplifying means and by connecting the output of the amplifying means to the record-reproduce portion of the transducing means 92. In this position, an electro-acoustical transducer such as a loud speaker, which is permanently connected across the output of the amplifying means, is also rendered effective to monitor the information being recorded on the tape 90. The pressure pads 94 and 96 hold the tape against the erase and record portions of the transducer; the pinch holder 130 holds the tape against the capstan 134 so that the tape is moved at a constant speed past the transducer; the takeup spool brake is released and this spool is driven at a speed sufficiently high to take up the tape through the mechanism including the capstan 134, the pinch roller 130, the pulley 132, the belt 62, and the pulley 60 which is gravity clutched to the spool support 54.

After the record has been made or at any time that it is desired to terminate the recording operation, the control knob 40 can be turned to another position, for example, the stop position. This movement of the knob 40 and the consequent movement of the lever 114 releases the interlock lever 140 so that the selector is returned by the spring 146 to the play position thereby rendering the erasing portion of the transducing means 92 ineffective. The recording operation can also be automatically terminated without interrupting the forward movement of the tape 90 by operating the selector to its play position, the construction being such that upon the application of sufficient force the detent ball 142 is moved out of the opening 144 in the lever 114.

In accordance with another object of the invention, the improved interlock mechanism provided by the levers 114 and 140 permits the electric and electroacoustical components of the apparatus 10 to be utilized as a low power public address system. More specifically, the play-record selector operated by the knob 38, which controls the connections to the input and the output of the amplifying means in the apparatus 10, can be independently operated to the record position when the main control is in a stop position in which the tape 90 is not moved. More specifically, the interlock mechanism is such that although the opening 144 and the ball detent 142 are not moved into interlocking engagement in any positions other than when the lever 114 is in the forward position, this selector can be manually turned to and held in a record position so that an external source of signals such as a microphone or an audio system is connected to the input of the amplifying means. Since a loud speaker is permanently connected to the output of the amplifier, a low power public address system is provided.

Accordingly, in the first embodiment of the present invention, the improved interlock mechanism comprising the levers 114 and 140 provides a simple, easily fabricated construction for preventing the inadvertent erasure of recorded information on the tape 90 by insuring that the selector controlling the connections to the erasing portion of the transducing means 92 can only be maintained in a record position when the main control is moved to the standard forward position in which the tape 90 is moved at a proper speed for transducing operations. Further, since the selector operated by the knob 38 can be turned to a record position and manually maintained therein in a stop setting of the main control, it is possible to utilize the electrical components of the apparatus 10 as a low power public address system thus increasing the uses to which the apparatus may be applied. The detachable engagement between the selector in its record position and the main control in its forward position is such that the selector 38 can be independently returned to a play position from its record to permit recorded passages on the tape 90 to be selectively erased and the further provision for automatically disengaging the interlock between the selector and the main control insures that the selector will be returned to the normal play position by the spring 146 in response to operation of the main control knob 40 to any of its operative settings.

Referring now to Fig. 3 of the drawings, therein is disclosed a second embodiment of the present invention comprising a recorder-reproducer apparatus indicated generally as 200. The apparatus 200 includes independently operable main and listen-record controls which are provided with an interlock for holding the listen-record control in a record position when the main control is in a forward position, thereby preventing an inadvertent erasure of recorded information, and when the main control is in a stop position, thereby permitting the apparatus 200 to be used as a public address system. The circuits associated with the controls and the interlock mechanism are characterized by a loud speaker which is continuously effective to receive output signals from an amplifier either for audibly monitoring signals to be recorded or for providing a public address system.

The apparatus 200 includes a main control 202 which controls the modes and types of movement of a magnetic tape 204, and a listen-record control unit indicated generally as 206. The unit 206 selectively controls the interconnection of a source of external signals, such as a microphone 210, and a record-reproduce transducing head 212 with the input and the output of an amplifier 208, the output of which is permanently connected to an electroacoustical transducer such as a loud speaker 214, and also controls the selective energization of an erase head 216 by a source 218 of erasing voltage.

More specifically, in the record position of the unit 206 shown in Fig. 3, the microphone 210 is connected to the input of the amplifier 208 and the output thereof is simultaneously applied to the loud speaker 214 and to the record-reproduce transducing head 212. In this position, the erasing head 216 is also connected to the source of erasing voltage 218 thereby to remove previously recorded information from the tape 204. In the listen position, the record-reproduce head 212 is connected to the input of the amplifier 208 so that recorded signals on the tape 204 are supplied through the amplifier 208 to the loud speaker 214, the erasing head 216 being rendered ineffective in this position.

In accordance with the present invention, an interlock mechanism indicated generally as 220 is provided for retaining the listen-record control unit 206 in the record position when the main control 202 is in either the forward or the stop position. When the main control 202 is in the forward position, the magnetic tape 204 is moved at a proper speed for transducing operation and, accordingly, the signals generated by the microphone 210 are amplified in the amplifier 208 and supplied to the recording head 212. To condition the apparatus 200 for use as a public address system, the main control 202 is turned to the stop position shown in Fig. 3 and the listen-record control unit 206 is turned to and retained in the record position. In this position, even though the magnetic tape 204 is not being advanced, the microphone 210 is effectively connected to the loud speaker 214 through the amplifier network 208, whereby a public address system is provided. Further, the interlock mechanism 220 is so constructed that the listen-record control unit 206 is automatically returned to its normal listen position in response to operation of the main control 202 to any of its operative settings.

Referring now to the main control 202 and the listen-record control unit 206, these assemblies are described in detail in my copending application, Serial No. 438,655, filed June 23, 1954 referred to hereinabove. As set forth therein, the main control 202 includes a knob 222 having an index mark 224 thereon which cooperates with indicia on a faceplate 226 to indicate the position to which the main control assembly 202 is adjusted. This control may be adjusted to a stop position in which the tape driving means are rendered ineffective so that there is no movement of the magnetic tape 204; a forward (Fwd) position in which the tape is advanced from a supply reel to a takeup reel at a normal speed for transducing operations; a fast-forward (Fast Fwd) position in which the tape is moved at a high speed from the supply reel to the takeup reels; and a rewind (Rwd) position in which the tape is returned from the takeup reel to the supply reel at a high rate of speed. As indicated heretofore, the tape driving means have not been illustrated but may be of the type disclosed in my above identified copending application.

The listen-record control unit 206 is manually operable selectively to condition the electrical circuits including the amplifier network 208, the transducer heads 212, 216, the microphone 210, and the loud speaker 214 for recording and reproducing or listening operations. It comprises a knob 228 having an index mark 230 cooperating with indicia (Record-Listen) on a faceplate 232. In the record position, the microphone 210 is connected to an input terminal 234 of the amplifier network 208 through a switch arm 236 forming a portion of the control unit 206. The output from the amplifier network 208 is simultaneously applied to the loud speaker 214 and to an operating winding 238 of the record-reproduce transducing head 212 through a switch arm 240 also forming a part of the unit 206. In this position, an operating winding 242 of the erase head 216 is connected to the source 218 of erasing voltage through a switch arm 244 also forming a portion of the control unit 206.

When the knob 228 is rotated to adjust the control unit 206 to the listen position, the switch arms 236 and 240 are moved into engagement with a pair of contacts 246 and 248 respectively, thereby disconnecting the microphone 210 from the input terminal 234 and the output of the amplifier network 208 from the record-reproduce head 212, and simultaneously therewith completing a series circuit extending from the operating winding 238 of the record-reproduce head 212 to the input terminal 234 of the amplifier 208 through the switch arms 236, 240 and the contacts 246 and 248. The operation of the unit 206 to the listen position also moves the switch arm 244 into engagement with a contact 250 which is connected directly to ground thereby disconnecting the operating winding 242 of the erasing head 216 from the source of erasing voltage 218 and connecting both sides of this winding to ground to prevent the erasure of signals from the tape 204.

In order to prevent the inadvertent erasure of recorded information from the tape 204, and, in order to permit the amplifier network 208 and the loud speaker 214 to be used as a public address system, the interlock mechanism 220 is provided for retaining the listen-record control unit 206 in a record position when the main control 202 is in either its stop or its forward position. This interlock mechanism also automatically returns the control 206 to the listen position in which the erasing head 216 is rendered ineffective when the main control 202 is moved from any one position to another. Further, the interlock mechanism 220 is so constructed and arranged that the controls 202 and 206 may be independently operated relative to each other.

The main control 202 includes a cam 252 which, as disclosed in detail in my copending application, is utilized in the control of the speed and direction of movement of the magnetic tape 204. In order to coordinate the positions of the listen-record control 206, which controls the recording of sound on and the reproduction of sound from the magnetic tape 204 with the speed and direction of movement of the tape and thus with the main control assembly 202, a mechanical linkage similar to that shown in this copending application is utilized. This linkage includes a lever 254 which is pivoted to a supporting base member at 256 so that a cam follower 258 secured thereto is held in engagement with the outer periphery of the main control cam 252 by a spring 260. The cam has a plurality of depressions 262, 264, 266, and 268 corresponding respectively to the fast-forward, forward, stop and rewind positions of the main control 202. These depressions are dimensioned so that when the cam follower 258 engages the depressions 264 and 266, the spring 260 deflects the lever 254 in a clockwise direction to permit an end of an interlock arm 270 carried by the shaft secured to the knob 228 to be moved beyond and engaged by a free end 254*a* of the lever 254 thereby to maintain the control unit 206 in its record position. When the cam follower 258 engages the depressions 262 and 268, the lever 254 is held in a counterclockwise deflected position in which the end 254*a* cannot be engaged by the end of the interlock arm 270. Accordingly, the control unit 206 will not be maintained in a record position by the lever 254 during either the rewind or the fast-forward movements of the tape 204.

The control 206 is automatically returned by a spring 272 to a listen position in which the erasing head 216 is ineffective in response to rotation of the main control cam 252 inasmuch as the engagement of the cam follower 258 with a plurality of raised portions or release surfaces 274, 276 and 278 separating the depressions 262, 264, 266, and 268 deflects the lever 254 in a counterclockwise direction to the position shown in dashed outline in Fig. 3. In this position, the end 254*a* of the lever is moved out of engagement with the free end of the interlock arm 270 thereby permitting the spring 272 to return the control unit 206 to a normal listen position.

In operation, when it is desired to record information on the tape 204, the main control 202 is rotated to the forward position in which the cam follower 254 is positioned within the depression 264 thereby resulting in the lever 254 being rotated to its clockwise deflected position. This movement of the main control 202 causes movement of the tape 204 in the direction indicated by the arrow in Fig. 3 at a proper speed for transducing operations as described more fully in my copending application. Thereafter, the control unit 206 is adjusted to the record position shown in Fig. 3 of the drawings wherein the microphone 210 is connected to the input terminal 234 of the amplifier network 208 and in which position the output of the amplifier network is connected to the operating winding 238 of the record-reproduce head 212 through the switch arm 240. At this time, the operating winding 242 of the erase head 216 is connected to the source 218 of erasing voltage through the switch arm 244. In addition to recording the signals provided by the microphone 210 on the tape 204, the amplified signals provided by the network 208 are applied to the loud speaker 214 to provide an audible monitor for the signals being recorded on the tape, this monitoring being made possible by the permanent interconnection of the loud speaker 214 with the amplifier network 208.

Following the recording of the desired information on the tape 204, the main control 202 can be adjusted to any of its other operative positions and, as a consequence thereof, the cam follower 258 engages one of the plurality of raised portions 274, 276, or 278 thereby deflecting the lever 254 in a counterclockwise direction so that the end 254*a* thereof is moved out of engagement with the interlock arm 270, thus permitting this arm to be returned to the position shown in dashed line in Fig. 3 in which the control 206 is conditioned for listening. This movement of the control unit 206 moves the switch arms 236, 240 and 244 into engagement with the contacts 246, 248, and 250, respectively, whereby the operating winding 238 of the record-reproduce head 212 is connected to the input terminal 234 of the amplifier network 208 and the operating winding 242 of the erase head 216 is connected directly to ground thereby to prevent the inadvertent erasure of previously recorded information on the tape 204.

When it is desired to utilize the apparatus 200 as a public address system, the main control 202 is adjusted to the stop position in which the cam follower 258 is received within the depression 266 thereby moving the lever 254 to its clockwise deflected position in which the free end 254*a* thereof is effective to engage and hold the interlock arm 270 of the listen-record control unit 206. In this position, the tape 204 is not driven by the tape propelling components of the apparatus 200. Thereafter, the control unit 206 is turned to the record position so that the switch arms 236, 244, and 240 interconnect the microphone 210 with the input terminal 234 of the amplifier network 208. In this position, the erase head 216 is also connected to the source 218 of erasing voltage through the switch arm 244 but this is of little or no consequence inasmuch as the magnetic tape 204 is not being advanced. Also, the interconnection of the record-reproduce head 212 with the output of the amplifier network 208 does not result in the distortion of information recorded on the tape 204 since movement thereof is arrested in the stop position of the main control 202.

Accordingly, the apparatus 200 including independently operable main controls 202 and listen-record controls 206 provides a means whereby the electronic components of the apparatus 200 including the amplifier network 208 can be rendered effective in a stop position of the main control 202 to provide a lower power public address system of general utility. Further, the interlock mechanism 220, in addition to permitting the apparatus 200 to be utilized as a public address system, prevents the inadvertent erasure of recorded signals on the tape 204 by insuring that the control 206 is retained in the record position in only the stop and forward positions of the main control and by further insuring the automatic release of the control 206 when the main control 202 is operated.

In summary, both embodiments of the present invention provide an improved tape recorder having listen-record control means which are retained in a record position in only a selected number of the operative settings of the main control to provide a tape recorder in which the inadvertent erasure of recorded information is prevented and in which the electrical components are capable of being utilized as monitoring or public address equipment without sacrificing the control over accidental erasing. Further, the provision of means for automatically returning the play-record or listen-record controls to their normal positions in response to movement of the main control to any of its operative settings insures the effectiveness of the interlock mechanism to prevent the inadvertent erasure of previously recorded information.

It should be understood that while the invention has been described in conjunction with the specific details of several illustrative embodiments, these details are not intended to be a limitation of the invention except insofar as set forth in the accompanying claims.

What is claimed as new and desired to be secured by Letters Patent of the United States is:

1. Recorder-reproducer apparatus of the type utilizing a longitudinally movable magnetizable medium, including in combination, means including a plural position main control means having a control element movable into at least three predetermined positions for conditioning the apparatus for moving the medium in forward and reverse directions and for stopping movement thereof, means including a plural position selector means movable to a position for conditioning the apparatus for recording operation when said main control means is in any of its predetermined positions; and means including interlock means controlled in accordance with movement of said control element to its three predetermined positions to asume settings in accordance with said positions, the movement of said interlock means to a setting corresponding to the forward position of the control element holding the selector means in said recording position.

2. Recorder-reproducer apparatus of the type utilizing a longitudinally movable magnetizable medium and having tape erasing means, including in combination, means including a rotatable plural position main control means having a plurality of control surfaces and movable into a predetermined position for conditioning the apparatus for movement of the medium at recording speed, means including a plural position selector means for conditioning the apparatus for reproducing or recording and rendering said erasing means effective, and means including an interlock mechanism cooperatively associating said two means for holding the selector means in its record position in said predetermined position of the main control means, said interlock mechanism including a first lever having a portion successively engaging said control surfaces of said main control means, a second lever operable with said selector means, and detent means on said levers enabling them to be moved independent of each other and to be moved into engagement when the first lever engages the control surface corresponding to said recording speed position of said main control means and said selector is in a position to condition the apparatus for recording.

3. Apparatus as claimed in claim 2 wherein said detent means comprises a ball on one lever and a ball receiving opening in the other, and said one lever is resilient.

4. Transducing apparatus utilizing an elongated record medium comprising transducing means, switching means connected to said transducing means for conditioning said transducing means for either recording or reproducing operations, said switching means being normally in a reproduce position, means for moving said medium relative to said transducing means, control means having a plurality of different rotatably displaced positions for producing movement of said medium in different directions and at different speeds, and two position interlock means controlled by said control means and effective in one position to maintain said switching means in a record position, said interlock means being movable from said one to its other position to release said switch means in response to each movement of said control means to a different position.

5. Transducing apparatus utilizing a movable magnetic medium comprising transducing means positioned adjacent the medium, first control means operable to at least two different positions for conditioning said transducing means for recording or reproducing operation, second control means operable to a plurality of settings for conditioning the apparatus for different types of medium movement, and interlock means controlled by said second control means for holding said first control means in a recording position in less than all but more than one of the settings of said second control means.

6. The apparatus set forth in claim 5 in which the interlock means is operative to hold said first control means in said recording position when the second control means conditions the apparatus to stop the medium.

7. Recorder-reproducer apparatus utilizing a magnetic medium comprising transducing means, selector means movable to a plurality of positions for conditioning said transducing means for recording or for reproducing operations on said medium, main control means movable to a plurality of settings for adjusting the type of movement of said medium and including a transducing setting in which the medium is moved at a transducing speed and a stop setting in which the medium is not moved, and interlock means cooperatively associating said selector means and said main control means to retain said selector means in said recording position following movement of said main control means to the stop or the transducing settings.

8. Recorder-reproducer apparatus utilizing a magnetic medium comprising transducing means, selector means including an arm movable to recording and reproducing positions to condition the transducing means for like operation, means for biasing said selector means toward said reproducing position, main control means including cam means having a plurality of control surfaces movable to different settings for conditioning said apparatus for different types of movement of said medium, and cam follower means cooperating with said control surfaces for selectively holding said arm and said selector means in a position in which the transducing means is conditioned for recording operation.

9. The apparatus defined by claim 8 in which the cam means includes release surfaces adjacent each of the control surfaces which cooperates with the cam follower means to release the selector means to move to a reproducing position when the cam means is operated.

10. Recorder-reproducer apparatus utilizing a magnetic medium comprising transducing means, switching means including an arm movable to different positions for conditioning said transducing means to record signals on or to reproduce signals from the medium, said control means including cam means movable to a plurality of settings for conditioning said apparatus for different modes of movement of the medium, said cam means having a plurality of control surfaces, and a movably mounted cam follower arm engaging said cam and having a free end disposed adjacent said arm, engagement of said cam follower with at least one of said control surfaces moving said free end into a position to engage and hold said arm thereby to retain the switching means in a selected position when said switching means is independently moved thereto.

11. The apparatus set forth in claim 10 in which the engagement of said cam follower arm with any of a plurality of control surfaces moves the free end of said follower into a position to engage said arm.

12. The apparatus set forth in claim 10 in which the apparatus includes erasing means which are selectively rendered effective by said switching means.

13. The apparatus set forth in claim 10 in which movement of said main control means to any of its settings returns said switching means to a position in which the transducing means are conditioned for reproducing operations.

14. An apparatus for recording generated signals on a magnetic medium and reproducing recorded signals from said medium comprising transducing means; amplifier means having input means and output means; switching means having at least two operative positions, said switching means in a first position rendering said amplifier means responsive to said generated signals and connecting said transducing means to said output means, said switching means being normally biased toward a second position in which the transducing means is connected to said input means; electroacoustical means continuously effective to receive amplifier signals from said output means; control means having a plurality of settings in which said medium is moved relative to said transducing means at different speeds and in different directions or in which said medium is stopped; and means controlled by said control means for holding said switching means in said first position when said control means is adjusted to more than one but less than all of said settings.

15. An apparatus for recording generated signals on a magnetic medium and reproducing recorded signals from said medium comprising transducing means; amplifier means having input means and output means; switching means having at least two operative positions, said switching means in a first position rendering said amplifying means responsive to said generated signals and connecting said transducing means to said output means, said switching means being normally biased toward a second position in which said transducing means is connected to said input means; electroacoustical means continuously effective to receive amplified signals from said output means; and means for releasably retaining said switching means in said first position.

16. Recorder-reproducer apparatus of the type utilizing a longitudinally movable magnetizable medium and tape erasing means, including in combination, means including a plural position main control means having a control element movable into at least two predetermined positions for conditioning the apparatus for moving the medium in a forward direction and for stopping movement of the medium; means including a plural position selector means movable into one position for rendering the erasing means effective when said main control means is in either of its two positions; and means including interlock means movable to two settings corresponding to the two positions of the control element, movement of said interlock means into the setting corresponding to the forward position of the control element conditioning said interlock means for maintaining the selector means in its said one position.

References Cited in the file of this patent

UNITED STATES PATENTS

| | | |
|---|---|---|
| 2,538,892 | Begun | Jan. 23, 1951 |
| 2,639,333 | Howell | May 19, 1953 |
| 2,645,682 | Lynch | July 14, 1953 |